United States Patent [19]

Dempster et al.

[11] 4,323,222
[45] Apr. 6, 1982

[54] CONTROL SYSTEMS FOR HYDRAULICALLY OPERATED ELEMENTS CIRCUITS OR SYSTEMS

[76] Inventors: David F. Dempster, 1 Coniston Ave., Fleetwood, Lancashire; John J. Wilson, 68 Church Rd., Thornton-Cleveleys, Lancashire, both of England

[21] Appl. No.: 47,739

[22] Filed: Jun. 12, 1979

[30] Foreign Application Priority Data

Jun. 13, 1978 [GB] United Kingdom ............... 26823/78

[51] Int. Cl.³ ........................... B66D 1/08; B66D 1/50
[52] U.S. Cl. .......................................... 254/274; 43/9; 254/291
[58] Field of Search ............... 254/273, 274, 275, 291, 254/315, 339, 361; 43/4.5, 7, 8, 9, 14, 27.4

[56] References Cited

U.S. PATENT DOCUMENTS 4,200,052  4/1970  Cunningham et al. .......... 254/315 X

FOREIGN PATENT DOCUMENTS

1161401  1/1964  Fed. Rep. of Germany ...... 254/315
2455829  8/1976  Fed. Rep. of Germany ...... 254/291

Primary Examiner—John M. Jillions
Attorney, Agent, or Firm—Scrivener, Clarke, Scrivener and Johnson

[57] ABSTRACT

Method of controlling two separately operable hydraulic circuits involving monitoring the pressure conditions in one of the circuits, comparing this pressure with a reference pressure which is established in the control system to produce a first error signal which is used to correct if necessary the pressure within the one circuit. Performing the same operation in the case of the second circuit using the same reference pressure. In particular the system and apparatus of the invention is used for controlling the tensions in the warps of a trawl automatically throughout the shooting, trawling and hauling-in of a trawl.

10 Claims, 4 Drawing Figures

CONTROL SYSTEMS FOR HYDRAULICALLY OPERATED ELEMENTS CIRCUITS OR SYSTEMS

BACKGROUND OF THE INVENTION

This invention relates to the control of hydraulically operated elements or systems.

A particular application of the present invention is to the control of two hydraulically driven winches so that they are effectively driven in step or unison irrespective of the effect of changes in external conditions upon the wires or warps of the winches.

In the control of two separate winches used to control the shooting, towing and hauling-in of the warps associated with a trawl as is commonly used for fishing it is important to know and ensure that the trawl equipment is always maintained, as far as possible, in an optimum setting for the purposes of fishing.

It is known that in the setting of a trawl particularly those incorporating trawl boards that the pay-out of the warps should be as uniform as possible. In practice, this requires careful control of the parallel operation of the two winches usually involved so that the tension forces in the warps remain as far as possible balanced. The tension forces in the warps arise from a variety of causes including the following-the loads imposed by the trawl itself, the weight of the warps payed-out, the weather conditions, the motion of the vessel or vessels in the case of pairs fishing in which latter one warp is controlled from one vessel and the other is controlled from a second vessel.

It is known that, under conditions of travelling straight ahead and in the absence of any under water obstructions or fasteners interfering with the free passage of the trawl, that a means of achieving balanced warps is to ensure that equal amounts of warp are payed-out.

In practice, visual markers on the warps have been used to indicate to the operator the relative positions of the warps in terms of the amounts payed-out. However, reliance solely upon visual markers calls for a continuous vigilance on the part of the operator, and such vigilance is very difficult to maintain under the conditions frequently encountered at sea. Such difficulties can readily be enhanced in the case of pairs fishing.

Also it has been proposed to use devices such as extensiometers for the purposes of monitoring the instantaneous tensions in the warps, and relying upon the operator to take whatever corrective action he thinks necessary to maintain balanced tensions in the warps.

A further difficulty with operator monitoring is that whilst the tensiometers provide indications of the tensions in the warps these indications do not necessarily provide a direct indication as to whether or not the warp with the larger tension is actually the warp with an incorrect tension. Such difficulties can arise through manoeuvering and as a result of cross currents.

Turning now to the possible conditions arising when a vessel changes its heading it will be apparent that the change of heading introduces a considerable variation in the relative positioning of the vessel and the trawl. Thus, in practice, it is possible when a tight turn has to be effected for the warps to cross over so that the actual tensions produced in the warps could wholly mislead the less experienced operator.

In the case of pairs fishing similar difficulties can arise. Additional problems also arise in maintaining relative stations between vessels such as are involved in keeping the trawl in its optimum setting.

Since the load on the winch barrel or drum is reflected in the pressure conditions prevailing in the hydraulic drive circuits for the winches it has been proposed to monitor the tension conditions in the warps indirectly by monitoring the pressure in the hydraulic drive circuits of the winches. In one such known arrangement the respective pressure levels in the hydraulic circuits are monitored and any difference between the pressure conditions in the respective circuits is used to adjust the system in such manner that the difference is eliminated. The adjustment is effected by automatically pressure balancing the pressures in the hydraulic circuits of the winches by providing a pressure balancing connection between the circuits. In such a system if the pressure increases or falls in any one circuit the change is compensated by shunting fluid from the other circuit irrespective of whether or not such is the correct adjustment to make. In other words the conditions within the two circuits are closely related.

SUMMARIES OF THE INVENTION

According to a first aspect of the invention there is provided a method of controlling at least two separately operable hydraulic elements, circuits or systems by separately monitoring the pressure conditions at predetermined locations of the elements, circuits or systems and separately comparing the results of each such monitoring with an associated reference pressure level thereby to provide separate error signals which are utilised separately to vary the conditions within the relevent hydraulic element, circuit or system thereby to bring the pressure therein to the level of the associated reference pressure.

Preferably, a common reference pressure level is used so that the pressures in the separate elements, circuits or systems are equalized relative to each other.

A further aspect of the invention provides a control system for controlling the operation of at least two separate hydraulic elements, circuits or systems, in which pressure conditions in the elements, circuits or systems are monitored and adjustments made thereto, the control system being characterised by including means enabling selective establishment of reference pressure levels characteristic of desired operational conditions for the elements, circuits or systems, separate means functionally associated with each of the hydraulic elements, circuits or systems for separately monitoring pressure conditions therein, and means for separately adjusting such pressure conditions such that such pressure conditions are each separately modified so as to maintain or return them to the associated reference pressure level.

Preferably, the hydraulic circuits or systems are provided for the purpose of separately controlling the shooting, towing and hauling-in of winch controlled cables, warps or the like associated with sea fishing or with other situations in which it is required to maintain equal tensions in two cables, warps or the like which are coupled to a common object such as a trawl.

Conveniently, a reference pressure level common to all said elements, circuits or systems is employed so that the pressure conditions therein can be equalised with this common reference pressure.

BRIEF DESCRIPTION OF THE DRAWINGS

For a better understanding of the invention and to show how to carry the same into effect reference will now be made to the accompanying drawings in which FIG. 1 schematically illustrates a combined electrical and hydraulic circuit for controlling the operation of a winch in relation to conditions prevailing in the warp controlled by the winch.

DESCRIPTION OF THE PREFERRED EMBODIMENTS

Figure 1:
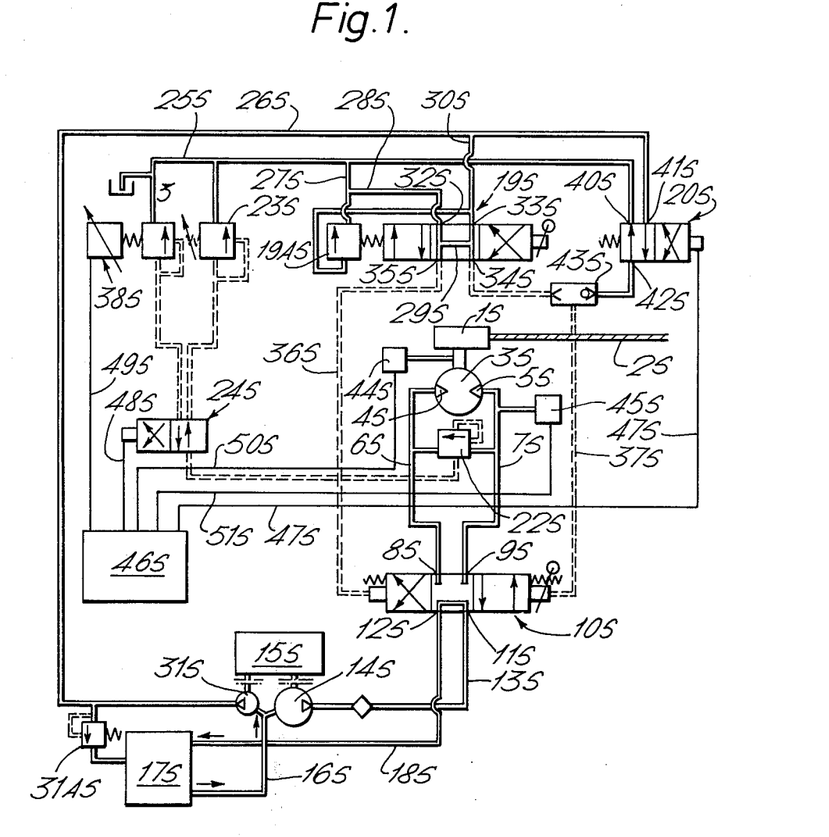

Referring now to FIG. 1 this very schematically discloses a control system for a single winch. Since it is desired to be able to control at least two such winches and since such an extended system will be considered hereinafter it is thought expedient to provide the reference numerals identifying the various components of FIG. 1 with the letter S to indicate a starboard position in relation to a composite shipboard installation having both starboard and port winch installations.

The system of FIG. 1 includes a winch 1S associated with a trawl wire or warp 2S which in practice is connected to the starboard side of a trawl (not shown). The winch 1S is connected to receive drive from a bi-directional hydraulic motor 3S having hydraulic fluid connections 4S and 5S which are respectively coupled by fluid lines 6S and 7S to connections 8S and 9S of a three position direction control valve 10S. The valve 10S includes two further fluid connections 11S and 12S.

The connection 11S is connected via a fluid line 13S to the output side of a main hydraulic fluid pump 14S which is connected to be driven by a prime mover 15S. The input side of the pump is connected by a fluid line 16S to the output side of a reservoir 17S. The connection 12S is connected via a hydraulic line 18S to the return of the reservoir 17S.

As has been mentioned the valve 10S is a three position valve having a neutral setting and two operated positions. In the neutral setting a open loop is formed in which hydraulic fluid cycles between the pump 14S and the reservoir 17S. In the first ON setting of the valve the connections 9S and 11S are connected. The connections 8S and 12S are likewise connected. In the second On setting the connections 9S and 12S are connected, and the connections 8S and 11S are likewise connected.

The valve 10s is essentially a slide valve whose slide element (not actually shown) is selectively positionally settable by operation of a manual control provided on the valve 10S, by operation of a remote manually operable control valve 19S or by an electromagnetically operable valve 20S. The operation of the valves 19S and 20S will be considered hereinafter.

The operational pressure levels within the hydraulic drive circuit for the motor 3S are set and controlled by an adjustable pressure relief valve 22S connected in parallel with the motor 3S.

The working pressure setting of the valve 22S is controlled by a hydraulic circuit including a manually operable valve 23S and a solenoid valve 24S connected between a drain line 25S and the control connection of the valve 22S.

The valve 19S is a three position valve having fluid connections 32S,33S,34S and 35S. The valve has a neutral setting in which all of the connections 32S to 35S are effectively interconnected. This is indicated by the H shaped internal connection defining the flow path 29S.

A pilot line 26S is connected to the outlet of a pump 31S driven from the prime mover 15S. The inlet side of the pump 31S is connected to the line 16S. The pilot line 26S also connects with the reservoir 17S by way of a pressure relief valve 31AS.

The pilot line 26S is coupled to the connection 33S. The return line 28S is coupled to the connection 32S. The pipe line leading to the valve 22S is a vent line and its back pressure determines the operational pressure of the valve 22S and is the pressure set by a manual valve 23S and a solenoid valve 38S.

The connection 35S is connected by way of a control line 36S to one side of the valve 10S such that the fluid pressure in the line 36S acts as to displace the valve 10S into the second ON position. Also the connection 34S is connected by a control line 37S to the other side of the valve 10S such that fluid pressure in the line acts on the valve 10S to displace the valve into its second ON setting or position.

The solenoid valve 38S is connected in parallel with the manual valve 23S. That is the valve 23S is connected between the drain line 25S and the solenoid valve 24S. The valve 38S is normally closed and is electrically opened.

The solenoid valve has a rest position or basic setting in which it is open to allow the fluid in the line between the valve 23S and the line 25S to be controlled by the valve 23S, but is closed with respect to fluid flow controlled by the solenoid valve 38S.

The actuated setting of the valve 24S is such that the drain line 25S is connectable with the valve 22S by way of the solenoid valve 38S but not the manual valve 23S.

The solenoid valve 20S has fluid connections 40S and 41S respectively connected with the fluid lines 25S and 26S, and a further connection 42S connected to the line 37S by way of a high pressure selector valve 43S having its valve elements controlling flow between the connection 42S or 34S and the line 37S.

In addition, the system as so far considered includes a warp length detection and indication unit 44S which is able to measure the amount of the warp payed-out at any instant, and a pressure transducer and indicator unit 45S which responds to the pressure conditions within the hydraulic circuit of the winch motor 3S.

The system includes an electronic control unit which is schematically shown in FIG. 1 as the rectangular block 46S. This unit is operationally connected by way of electrical connections with the solenoid valves and the units 44S and 45S. The electronic circuit will be considered hereinafter. For the present it is convenient to note that the unit 46S is connected to the solenoid valves 20S, 24S and 38S and the two units 44S and 45S by electrical connections 47S,48S,49S,50S and 51S respectively.

As so for considered the system is concerned with the control of a single warp 2S. In order to control two warps it is necessary to provide an identical system for the second warp.

Figure 2:
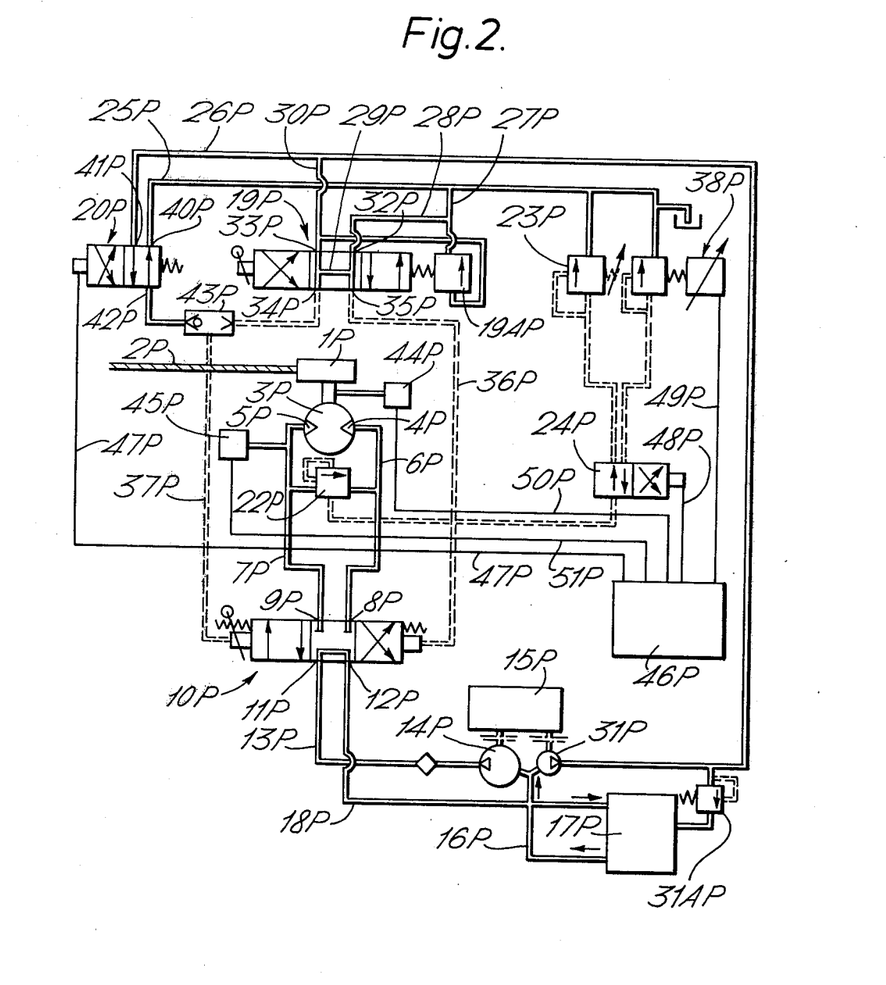
FIG. 2 is an illustration of a combined electrical and hydraulic circuit for controlling the operation of a second winch, the arrangement of FIG. 2 being essentially the same as that of FIG. 1, but indicative of a circuit for controlling a port side winch when the FIG. 1 circuit is concerned with a starboard side winch in the case of a winch installation provided on a vessel such as a trawler.

FIG. 2 illustrates a system for controlling such a second warp. In the Figure the hydraulic and electronic components are identical to those of FIG. 1 so that except for identifying the various components by the addition of the letter P, for port side, additional description is not thought necessary.

Figure 3:
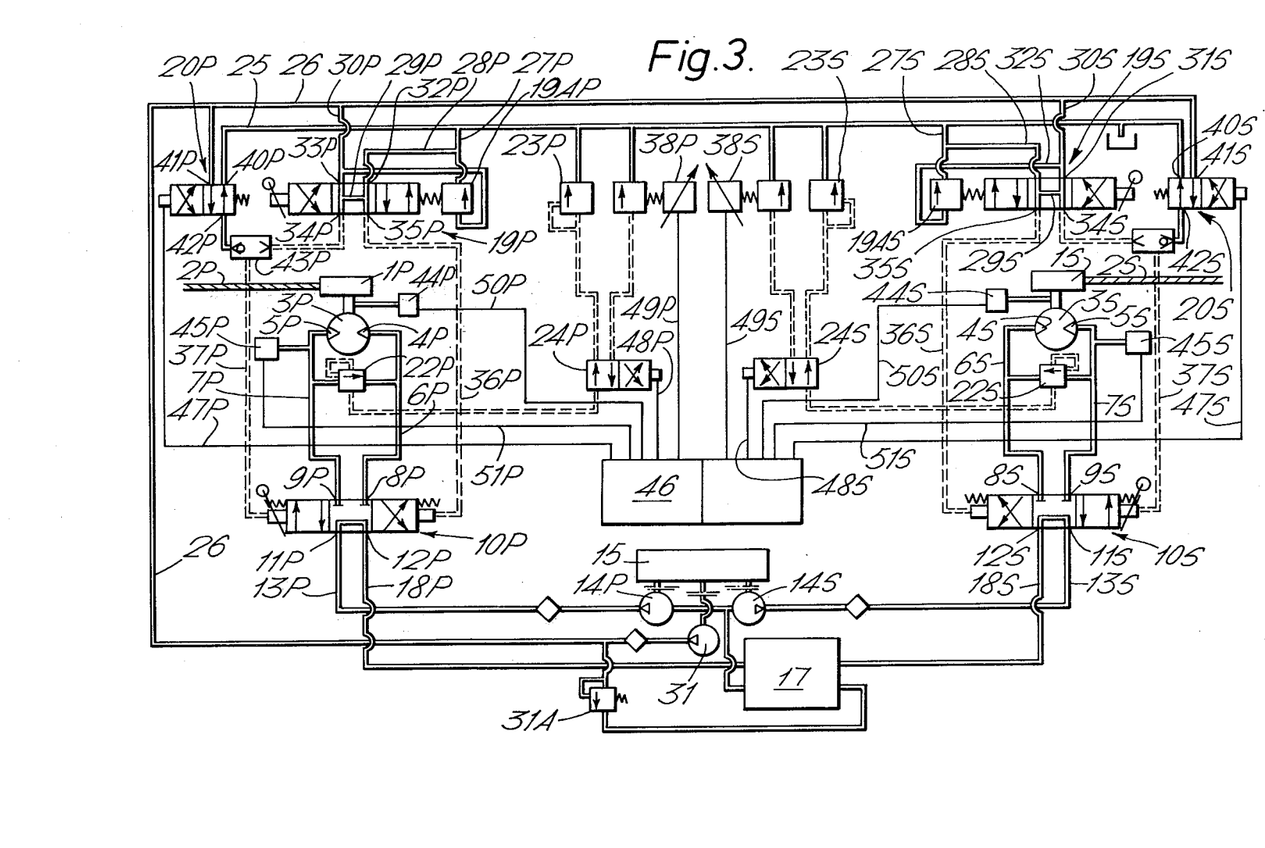
FIG. 3 illustrates a composite circuit comprising the circuits of FIGS. 1 and 2, and illustrating the use of certain components common to both circuits.

It will be appreciated that in a practical installation such as would be installed in a single vessel duplication of components would as far as possible be avoided. Thus FIG. 3 illustrates a combined system for controlling two winches 1P and 1S. In this Figure it will be seen that whilst the actual control of the movements of the warps are maintained completely independent of each other it is possible to utilise as the common components the prime mover 15, which now has multi-outputs, a single pilot line pump 31, a single pilot line 26, a single drain fluid line 25 and a single reservoir 17.

Also the electronic unit 46 is shown in FIG. 3 as being common to both parts of the combined system. It is important to note that from a hydraulic functional aspect there is no comparison direct or otherwise of the tension conditions prevailing in the port half of the system with conditions prevailing in the starboard half of the system.

Figure 4:
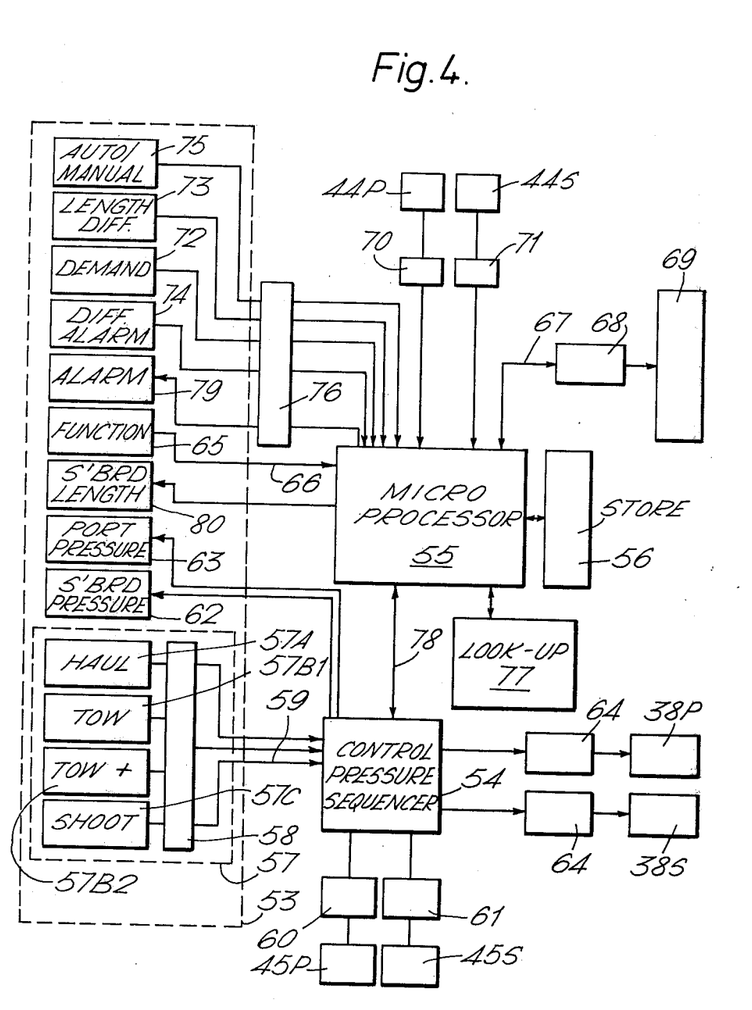
FIG. 4 is a schematic block diagram of the electronic arrangements associated with the circuits of FIGS. 1 to 3.

The electronic circuit 46 is intended to provide a continuous monitoring of the instantaneous pressures or tensions in the two warps 2P and 2S and to relate these instantaneous values to a number of preselectable reference factors characteristic of certain operational factors involved in the trawling operation such as shooting, towing, hauling-in, so as to produce as and when required control signals for operating the solenoid valves particularly the valves 38P and 38S. Also the electronic circuit is required to respond to situations which interfere with the normal trawling operation and to produce suitable alarm signals when necessary.

In the first place it is convenient to consider the various control parameters with which the electronic circuit is intended to be concerned. Some of these factors can be considered as variables in that the values thereof are basically dependent upon the prevailing fishing conditions such as the vessel speed to be used, the trawling depth, whilst others are essentially constant in the sense that they are substantially common to to design of the system.

The variable factors include the tension or pressures acceptable in the warps during shooting, towing, and hauling-in, the required length of the warps (the demand) whilst the relatively constant factors include a convertion factor to convert winch revolutions into warp length units in fathoms, the length of warp payed-out at which the unit 46 changes operation between manual and electronic operation, the warp length difference alarm (this being the length by which either warp must exceed demand length before initiating an alarm condition), the warp length difference (this being a value which represents the length by which either warp must exceed the length demand for the associated winch pressure to increase to a maximum), and the length of warp that can be payed-out as a result of a fastener condition before initiating a corrective control function together with the extent of wrap pay-out following a fastener condition before producing an alarm indication.

The electronic circuit can conveniently be regarded as incorporating three major sections; a control and information display unit 53 which enables the presetting of the selectively variable reference values and also provides for the display of the operational state of the system; a warp pressure control sequencing unit 54, which compares the presettable reference values relating to pressure of the warps with the instantaneous values thereof to provide inter alia control signals for the valves 38P and 38S; and a Microprocessor 55 having an associated program store 56. The microprocessor 55 serves to inter-relate control-wise the presettable factors relating to warp length and pressure with the instantaneous warp length and pressure conditions and the winch operation and with the substantially constant factors.

The control and display unit 53 includes a first primary section 57 which enables selective presetting of the reference values of the warp thought necessary in the warps during the principal operation conditions arising during trawling namely, during shooting, normal towing, tow-plus towing, and shooting. In the Figure the associated control enabling these settings are respectively indicated by the boxes 57A,57B1, 57B2 and 57C. These controls produce associated output signals each characteristic of the preset value which are fed through a suitable interface unit or units 58 along a bus 59 to the pressure sequencer and control unit 54 which latter is essentially a comparator circuit capable of comparing the references values with the continuously varying values and producing control outputs and indication outputs. The unit 54 has two further inputs which are connected to receive via associated interface means 60;61 the output signals from the warp pressure detectors 45P and 45S.

The unit 53 includes indicators 62;63 which respectively provide an indication of the associated instantaneous values of the port and starboard warp tensions, these indicators being connected to receive input from the unit 54. The latter produces the control signals for the solenoid valves 38P and 38S by way of associated signal amplifiers 64. These control signals serve to adjust the settings of the valves 38P and 38S and thus the operational rate of the associated winches.

The unit 53 also includes a manually settable function control switch unit 65 which enables the primary trawling conditions to be set into the control unit, these conditions being, shooting, normal towing, tow-plus and haul. The unit 65 is connected by a signal bus 66 to the microprocessor 55 which latter produces from the signals from the unit 65 control signal outputs which are fed via a bus 67 through an interface unit 68 to the various solenoid valves 20P,20S; 24P and 24S. In FIG. 4 these valves are collectively represented by the block 69.

The outputs from the winch revolutions counters 44P and 44S are applied via associated signal interface units 70 and 71 to the microprocessor 55. The unit 53 also includes controls 72,73 and 74 whereby the above defined factors warp demand, the length difference and the length difference alarm can be respectively selectively set into the microprocessor 55.

In addition, the unit 53 includes a control 75 for setting the warp length value at which the system changes over between manual and automatic operation. Associated signal interface arrangements 76 are provided for the controls 72 to 75.

The above mentioned relatively constant values are stored in a storage unit in the form of a look-up table 77 which affords storage facilities for factors such as winch revolutions to warp pay-out convertion ratio, the amount of warp to be payed-out during manual control, the length of warp to be payed-out during the first stage of a fastener condition, the length of warp to be payed-out during the alarm stage of fastener control.

A control signal bus 78 is provided between the microprocessor 55 and the pressure sequencer circuit 54.

The unit 53 also includes an alarm unit 79 associated with the fastener control arrangements and is actuated by signals from the microprocessor 55.

The unit 53 for convenience provides a continuous visual display in digital form 80 of the amount of the starboard warp actually payed out.

In addition the facility is provided whereby the digital display 80 can be used to display the instantaneous values of the following factors, this display being in cyclic form. This facility is controlled by a switch (not shown). The factors include port warp length; starboard length difference; port length difference; winch revolutions devisor; auto/manual changeover length; length difference alarm; length difference; length demand and starboard length.

The microprocessor used in the above discussed electronic unit is a Fairchild Semiconductor Inc. Micromachine F8 Series Microprocessor and includes a central processor unit F3850, an F8 program storage unit which includes F2708 programmable read only memories and an F8 static memory interface unit such as required in any particular installation.

The manner in which the system operates will now be considered. In the first place the manual control will be discussed. For convenience in view of the identity of the two parts of the combined system only the starboard part will be discussed in detail in connection with the manual aspects. The prime mover 15 is set into operation thereby to drive the pumps 14S and 31S.

At this stage the operational settings of the various valves in the system are as shown in the Figures. Consequently, since the valve 10S is in the neutral setting the above mentioned cycling of the hydraulic fluid is taking place between the pump 14S and the reservoir 17S. Also pilot pressure is delivered from the pilot line 26S to the drain lines 25S by way of the lines 30S, the valve 19S, and the lines 28S and 27S.

For the purpose of manual control the valve 23S is set into its ON position in which the drain line 25S is connected to the relief valve 22S. The particular setting of the valve 23S determines the pressure at which the valve 23S operates to relieve pressure at the motor 3S.

The valve 10S is set to the first ON position in which the connections 9S,11S, and 8S, 12S are operationally coupled so that the high pressure fluid is delivered to the pump 3S in the direction that enables the warp 2S to be payed-out. The amount of warp payed-out is indicated by the warp length indicator 44S. Since the system is under manual control the reading will be in the form of a visual indication or record.

It will be understood that the pressure prevailing in the system will be indicated by visual pressure gauges and/or the unit 45S.

In order to haul-in the warp the setting of the valve 10S has to be altered so that the connections 8S,11S and 9S, 12S are connected, whereby fluid flow through the motor is reversed this being the second ON position for the valve 10S.

If it is required to operate the system from an alternative position to that at which the valve 10S is sited the valve 19S is used. In practice, the valve 10S would be sited adjacent to the winch installation of the vessel and the valve 19S would be located in the bridge housing or the like.

The valve 19S is such that the pilot line pressure can be applied to one side or the other of the valve 10S by way of fluid lines 36S and 37S to cause operation of the valve from its neutral position to a selected one of its two ON settings or positions.

Thus to cause the movement of the valve 10S to the warp pay-out setting pressure has to be applied by way of lines 36S. Thus the valve 19S is moved to the left as seen in the Figure. With this movement the pressure balance between the lines 36S and 37S, because of the line 29S is removed and also the pilot line 26S is cut-off from the line 37S leaving line 36S connected to receive pilot pressure.

Application of the pressure to the line 36S operates the valve 10S accordingly.

Similarly to haul-in the warp 2S the valve 19S is operated in the reverse direction so that the pilot line pressure is applied to the line 37S and not the line 36S thereby causing the resetting of the valve 10S into its warp haul-in setting.

If the load in the motor drive circuit should exceed the pressure defined by the setting of the manual valve 23S the relief valve 22S operates to allow the pressurised fluid to be bypassed relative to the motor.

The above described modes of control apply directly to the use of the valves associated with the warp 2P. Thus a detailed discussion is not required.

In so far as FIG. 3 is concerned it will be understood that the manual valves would be operated as required to ensure that the amount of warp paying-out is kept as close as possible the same for each warp.

In practice, the manual control is restricted to use when lowering the trawl into the water and the paying-out of a short length of warp sufficient to ensure that the trawl is clear of the vessel. Similarly the manual control is used during the final stages of hauling-in the warps and the removal of the trawl from the water.

The main shooting, towing and hauling operations are effected under the control of the electronic unit 46.

For convenience, whilst the mode of the control of the warp 2S will be particularly discussed it will be understood that the individual modes of control of the warp 2P is precisely the same as that of the warp 2S. Furthermore, it should be bourne in mind that at any one instant the actual control function being effected in any one of the warps is not necessarily the same as that being effected in the other warp once the initial stages of the electronic control have been effected.

To shoot the trawl the initial stages are effected manually as above described, after which the electronic unit 46 is switched ON by operating the function switch 65. The operator then sets into the unit the various variable factors mentioned above, i.e., the various pressure levels for shoot, towing and haul and the warp demand. Also the relevent length difference factors are set.

The pressure sequencing unit 54 then operates thereby continuously comparing the outputs of the warp pressure transducers 45P and 45S with the preset values and the microprocessor will be operating upon the outputs from the winch revolution indicators 44P and 44S in relation to the various other factors specified by the operator and those effectively permanently set into the unit, whereby the operational conditions prevailing in each warp are separately monitored and controlled by reference to the standard, dummy or reference conditions set-up in the electronic unit. With this arrangement the control of either warp is essentially completely separate and independent of the control of the other warp in that the control of the conditions in one warp do not require or involve any reference or comparison with the conditions in the other warp. In other words the control of a warp is carried out by comparing the operational conditions therein with a reference value of a dummy set of values simulating desired conditions. In view of this the control action being effected, at any one instant of time, in relation to one warp may well be completely opposite to the control action being effected at the other warp.

Thus following the switching-ON of electronic control the operation of the pressure sequencing unit 54 produces independent control signals which are respectively applied to the valves 38S and 38P by way of the lines 49S and 49P. In addition, the microprocessor 55 produces independent signals along the output bus 67 to the solenoid group 68. That is in relation to FIGS. 1 to 3, along the lines 48P,48S to operate the valves 24P, 24S, and along the lines 47P,47S to operate the valves 20P, 20S.

The consequences of the operation of these various valves will now be considered.

The operation of the valve pairs 38P,24P and 38S, 24S connects the pilot line 25 by way of these associated valve pairs with the relief valves 22P,22S thereby to set the operational pressures of the motors 3P, 3S. The operation of the valves 20P, 20S applies pilot pressure to the respective hydraulic line 37P or 37S by way of the associated selector valves 43P, 43S so that a higher fluid pressure is produced in the lines 37P,37S as compared with the pressure in the lines 36P,36S. Consequently each directional control valve 10P, 10S is set into the heave or haul position for the associated motor 3P,3S.

Following initial setting of the above mentioned control valves the low pressure setting of the relief valves 22P,22S allows the warps 2P,2S to be drawn-off the winch drums.

The drawing-off of the warps even though the winches are in their heave conditions arises from the fact that the pull or tension induced in the warps by the winches attempting to turn in the hauling direction is less than the load induced by the combined effects of the resistance of the trawl to movement through the water, the weight of the trawl and warps etc. Consequently, as the vessel moves ahead warp is payed-out. The rate at which the warps are payed-out is set by the relief pressure levels established by the valves 38P,38S.

Throughout this warp paying-out or shooting the electronic circuit is continuously monitoring the amount of warp actually payed-out in each case with the preset requirements. In addition, the instantaneous pressure readings of the transducer units 45P,45S are continuously compared by the comparator, circuits in the control unit 54 with the values preset into the system by the operator to ensure that the individual pressure conditions in each warp are being maintained according to the preset reference levels.

In the event that there is, for either warp, a difference between the instantaneous pressure and the electronically defined reference pressure levels the electronic unit 46 produces a variation in the signel applied to the relevent control valve 38P, 38S so as to vary the relief pressure setting thereby the change the rate at which the associated winch is able to pay out warp.

During the above discussed operation the electronic unit will be monitoring the port and starboard side pressure and will be comparing the port signal with the reference and sending an error signal to the associated port valve 38P, and comparing the starboard signal with the reference and sending an error signal to the associated starboard valve 38S. The combined effect of the procedure is to separately equalize the port pressure with the reference and the starboard pressure with the reference whereby port pressure equals starboard pressure equals reference pressure.

As the warp pay-out nears the amount required it is desirable to initiate a slowing down of the rate of warp pay-out. The electronic unit effects this by responding to the detection of a predetermined difference between these two factors and producing a variation i.e., increase in the pressure settings of the valves 38P and 38S thereby reducing rate of warp pay-out.

A revolution responsive device (not shown) is provided for limiting the rate of rotation of the winches. The device is arranged to feed error signals to the port and starboard valves 38P and 38S.

The variation in the setting of the valves 38P and 38S is maintained until the tension in each warp is attains a preset towing pressure and the required amount of warp has been payed-out.

As soon as the electronic unit indication arrangements show that the preset towing conditions have been achieved the control unit is then set to the operational conditions relating to towing. This is the TOW condition.

The effect of selecting this condition is that the pressure settings of the valves 38P and 38S are increased to a level which is capable of enabling the energization of the winch motors 3P and 3S sufficiently to maintain (in mathematical terms) the integral of the warp pressure constant. In this TOW condition the valves 20P and 20S are in their On settings.

Throughout the towing process the electronic unit will be affecting the above mentioned monitoring process and will automatically effect the relevent adjustments in the settings of the relevent valves 38P and 38S. These variations in tensions can arise when the vessel is being manoeuvered for the purposes of change of course, as a consequence of the rise and fall of the vessel due to wave motions, and the effects of cross currents on the vessel heading.

During turning of the vessel it is clear that the turning movement will result in the tension in one warp decreasing i.e., the warp on the inside of the turn and the tension in the warp on the outside of the turn increasing. Consequently the electronics unit 46 is so responsive to the consequential change in the hydraulic pressure readings from the transducer units 45P and 45S that the control valves 38P and 38S will be varied. Thus the valve associated with the reduced tension will be adjusted to cause the winch associated therewith to take-up warp so as to restore the original tension. This is a continuing process and commences as soon as the tension change is sufficient to initiate a control function. Similarly the control valve associated with the warp with the increased tension will be adjusted in the opposite sense so as to pay-out more warp to accommodate the vessel turing circle. This simultaneous independent control of the warps ensures that the trawl is effectively steered around the turn without the mouth of the trawl closing and thereby interferring with the fishing operation.

As the vessel starts to approach the new desired heading the control unit continuously adjusts the warp payout or hauling-in by monitoring the tension whereby by the time the vessel is moving along its new heading the warps have been returned to their original conditions.

The above control of the warps during manoeuvering will also take place when cross currents are producing unequal warp tensions.

In the case of wave compensation the pitching and tossing of the vessel is accommodated by the response of the system to the consequential tension variations.

In view of the likelihood of the trawl fouling obstructions (this being a particular hazard of Granton fishing) on the sea bed the control system incorporates an obstruction correction and clearing control function which is automatically initiated whenever the trawl or warps become fouled by an obstruction. This control function is based upon the fact that if one of the warps becomes fouled the tension therein increases. On detection of this tension increase the electronic unit 46 allows a preset length of the warp involved to be payed-out. The purpose of this is to ascertain whether the resulting slackness produced in the warp will allow the warp to free itself or the trawl to free itself from the obstruction. On completion of this obstruction warp pay-out if the obstruction still persists the tension will continue to increase. As a result of this additional tension increase the control unit 46 will increase the control setting of the relevent valve 38P or 38S so that an increased tension is allowed in the system.

This increased tension is intended to see if force will free the trawl or warp from the obstruction. If the operation is not successful the electronic control unit 46 will after the tension has attained a presettable maximum value initiate operation of an alarm system and at the same time automatically readjust the pressure settings of the valves 38P and 38S so that the warps can pay-out thereby to reduce the chance of unnecessary damage to the trawl or warp(s).

In the event that the obstruction is cleared by either of the techniques above mentioned the freeing of the warps or trawl will result in the tension falling from the obstruction levels. The electronic unit 46 responds to this fall in tension by adjusting the settings of the valves 38P and 38S to restore the previous levels of tension and thus the required TOW condition.

It will be understood that in the event that both warps or as is more likely the trawl itself is obstructed the above described sequence of events will take place in connection with each warp and with the requisite control functions being carried out with respect to each warp independently of the other warp.

If the fishing conditions are such that the normal pressures used for the TOW are not adequate the electronic unit 46 is set to an operational condition termed TOW PLUS. In this setting the unit increases the flow levels for the winch motors so that more power is available to maintain the desired setting of the trawl.

When it is required to haul in the trawl the electronic control unit is switched to the HAUL condition. When in this condition the control valves 38P and 38S are reset so that the operating pressure for the winch motors 3P and 3S is at a relatively high value thereby enabling the winches to haul-in the warps and the trawl.

Throughout the hauling-in process the control unit 46 is continuously monitoring the tension conditions within the warps and effecting the above discussed control functions in relation to the instantaneous tensions in the warps. Thus, throughout the haul operation the winding-in of the warps is maintained uniform.

The HAUL process continues until the trawl is returned to a predetermined distance from the vessel. In practice, this will be the position corresponding to the amount of the warps payed-out at the end of the manual shooting procedure.

As soon as this is detected by the electronic unit the electronic unit automatically reverts to manual mode and the solenoid operated valves all return to their initial settings as shown in the FIGS. 1 to 3.

That is to say the valves 10P and 10S are returned to their neutral setting and the valves 24P and 24S are returned to their settings which enable manual control.

The trawl is hauled aboard by the appropriate operation of the manually controlled valves 23P and 23S and 10P and 10S.

It is to be noted that the above considered electronic/hydraulic circuit is a relatively simplified circuit as compared with an installation actually to be installed and is intended to illustrate the principles of operation of the system of the invention. In a practical installation there would be provided various check valves, throttle valves, relief valves for dumping excess fluid pressures, braking systems for the winches and oil cooling arrangements.

Furthermore, from the safety aspect it may be found necessary to duplicate sections of the system.

I claim:

1. A control system for controlling hydraulically operated winch assemblies whose cables, wires or the like are intended to be connected with the same trawl or other form of net used for sea fishing or for use with other objects or in situations in which it is required to maintain predetermined tensions in the cables, wires or the like, the control system including means for enabling a number of reference pressure levels each indicative of a particular required operational condition for the cables, wires or the like; such as paying-out, continuous pull, hauling-in; separate means for monitoring the operational conditions of the winch assemblies; means for comparing the results of the monitoring with an associated one of said reference pressure levels thereby to provide associated operational condition indication signals; and control means so responsive to such signals as to cause independent corresponding variation of the operational conditions of the relevant winch assembly; said control system further comprising interference response means responsive to interference to a required movement of the common object, the interference responsive means including means for enabling paying-out of a predetermined additional length of cables, wires or the like; means for detecting whether the interference still persists following the pay-out of the additional length of the cables, wires or the like and for arresting any such additional pay-out thereby to permit the tension conditions in the cables, wires or the like to increase to a predetermined higher level to enable application of increased force on the object connected thereto for the purposes of attempting forcibly to free the said object from the interference; and means for causing adjustment of the control means to allow further paying-out of the cable, wire or the like if said interference still persists so as to prevent said higher level being exceeded, and to provide an alarm signal indicative that the predetermined higher level had been attained and that the interference still persists.

2. A control system as claimed in claim 1, and including means for enabling manual adjustment and operation of the control means for the purposes of varying the operational conditions of the hydraulic winch assemblies; and means for enabling automatic changeover between manual and non-manual operation when the amount of cable, wire or the like payed-out is not greater than a preselectable amount.

3. A control system as claimed in claim 1, and in which said reference pressure levels include one characteristic of a predetermined difference in the lengths of cables, wires or the like payed-out by the winch assemblies, and in which means are provided for producing a signal related to the actual difference in the amounts of cables, wires or the like payed-out; said control means being so responsive to the length difference reference level and said actual length difference as to produce an alarm or other indication of the condition that the amount of the cables payed-out by the winch assemblies has exceeded a predetermined level.

4. A control system as claimed in claim 1, in which a control and information display unit is adapted to enable presetting of said selectively variable reference values and display of the operational state of the control system; a pressure control sequency unit enables comparison of the presettable reference pressure levels with the instantanious values of the said winch assembly operational conditions; and a microprocessor unit enables inter-relating presettable and instantaneous values of the lengths, cables, wires or the like and tensions with the corresponding reference levels.

5. A control system for controlling hydraulically operated winch assemblies whose cables, wires or the like are intended to be connected with the same trawl or other form of net used for sea fishing or for use with other objects or in situations in which it is required to maintain predetermined tensions in the cables, wires or the like, the control system including means for enabling a number of reference pressure levels each indicative of a particular required operational condition for the cables, wires or the like; such as paying-out, continuous pull, hauling-in; separate means for monitoring the operational conditions of the winch assemblies; means for comparing the results of the monitoring with an associated one of said reference pressure levels thereby to provide associated operational condition indication signals; and control means so responsive to such signals as to cause independent corresponding variation of the operational conditions of the relevant winch assembly; and in which said reference pressure levels include one characteristic of a predetermined difference in the lengths of the cables, wires or the like payed-out by the winch assemblies, and in which means are provided for producing a signal related to the actual difference in the amounts of cables, wires or the like payed-out, said control means being so responsive to the length difference reference level and said actual length difference as to produce an alarm or other indication of the condition that the amounts of the cables payed-out by the winch assemblies has exceeded a predetermined level.

6. A control system for controlling hydraulically operated winch assemblies whose cables, wires or the like are intended to be connected with the same trawl or other form of net used for sea fishing or for use with other objects or in situations in which it is required to maintain predetermined tensions in the cables, wires or the like, the control system including means for enabling a number of reference pressure levels each indicative of a particular required operational condition for the cables, wires or the like; such as paying-out, continuous pull, hauling-in; separate means for monitoring the operational conditions of the winch assemblies; means for comparing the results of the monitoring with an associated one of said reference pressure levels thereby to provide associated operational condition indication signals; and control means so responsive to such signals as to cause independent corresponding variation of the operational conditions of the relevant winch assembly; and in which said reference pressure levels include one characteristic of a predetermined difference in the lengths of the cables, wires or the like payed-out by the winch assemblies, and in which means are provided for producing a signal related to the actual difference in the amounts of cables, wires or the like payed-out said control means being so responsive to the length difference reference level and said actual length difference as to produce an alarm or other indication of the condition that the amounts of the cables payed-out by the winch assemblies has exceeded a predetermined level; said control system further comprising interference response means responsive to interference to a required movement of the common object of the interference responsive means including means for enabling paying-out of a predetermined additional length of cables, wires or the like means for detecting whether the interference still persists following the pay-out of the additional length of the cables wires or the like and for arresting any such additional pay-out thereby to permit the tension conditions in the cables, wires or the like to increase to a predetermined higher level to enable application of increased force on the object connected thereto for the purposes of attempting forcibly to free the said object from the interference; and means for causing adjustment of the control means to allow further paying-out of the cable, wire or the like if said interference still persists so as to prevent said higher level being exceeded, and to provide an alarm signal indicative that the predetermined higher level had been attained and that the interference still persists.

7. A method of controlling hydraulically operated winch assemblies whose cables, wires or the like, are intended to be connected with trawls or other forms of net used for sea fishing or for use with other objects or in situations in which it is required to maintain predetermined tensions in the cables, wires or the like, during the operation or use of the winch assemblies; the method including the steps of defining for each winch assembly a number of operational states including those characteristic of tension conditions acceptable in the cables during the operations of paying out, continuous pull, heaving in; establishing for each operational state a reference pressure level which is characteristic of the tension produced in the associated cable, wire or the like when the winch assembly thereof is operating at the selected operational state; separately monitoring during operation of the winch assemblies the instantaneous tensions; separately comparing for each winch assembly the instantaneous tension with the relevant reference pressure level applicable to the operational state required for that winch assembly to provide for each such comparison a control signal charcteristic of any difference between the instantaneous tension and the relevant pressure level; using the control signals to control means for separately adjusting the operational state of the associated winch assembly such that the instantaneous tensions are independently adjusted to maintain the required predetermined relationship between the cable, wires or the like, such method also including the steps of setting a reference pressure level characteristic of a predetermined difference in the length of the cables, wires or the like payed-out by the winch assemblies; monitoring the amounts of cables, wires or the like payed-out at any instant by each winch assembly; producing further control signals related to the difference in the amounts of cables, wires or the like payed-out; and using these further control signals to produce an alarm or other indication of the condition that the difference in the amount of the cables, wires or the like payed-out has exceeded a predetermined level.

8. A method as claimed in claim 7, and in which the method further includes the steps of detecting when any interference to the movement of the trawl, object of the like causes the normally acceptable continuous pull tension in the cables to start to exceed a relevant maximum acceptable pressure level, and following said detection causing operation of the winch assemblies to pay-out further predetermined lengths of cable; additionally ascertaining whether or not the additional cable payed-out leads to the removal of the interference and thus a reduction in the instantaneous cable tensions to values less than the relevant maximum acceptable reference pressure level; and producing an indication in the event that the tension continues to remain greater than the relevant reference condition.

9. A method as claimed in claim 8, in which following the pay-out of the additional lengths of cable and the production of said indication the instantaneous cable tensions are allowed to increase above the normally acceptable maximum pressure level to a predetermined excess level thereby to enable an increased pulling force to be exerted upon the trawl or other object being towed by the cables for the purposes of attempting to free the trawl or other object from the interference; separately monitoring the instantaneous in the cables to produce signals characteristic of such tensions and comparing such signals with signals related to the excess pressure level; allowing one of the instantaneous cable tensions to attain the excess level and when such condition is attained causing the control means for the winch assemblies to be operated to allow further pay-out of the cables to avoid the said excess tension from being exceeded and at the same time producing an alarm indication to the effect that the excess tension condition has been attained and that cable is being payed-out because of a sustained interference condition.

10. A method as claimed in claim 7, in which the initial stages of the paying-out and the later stages of the hauling-in are under manual control, and in which there is an automatic change-over between manual control and non-manual control by comparison of instantaneous cable tensions with a reference level indicative that a predetermined amount of cable is payed out from the winch assemblies.

* * * * *